United States Patent
Lemp et al.

(10) Patent No.: US 10,173,665 B2
(45) Date of Patent: Jan. 8, 2019

(54) TRANSMISSION CONTROL METHOD

(71) Applicant: ZF Friedrichshafen AG, Friedrichshafen (DE)

(72) Inventors: Thomas Lemp, Langenargen (DE); Christoph Hess, Eriskirch (DE); Falko Platzer, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 294 days.

(21) Appl. No.: 15/147,432

(22) Filed: May 5, 2016

(65) Prior Publication Data

US 2016/0325736 A1    Nov. 10, 2016

(30) Foreign Application Priority Data

May 6, 2015 (DE) ........................ 10 2015 208 402

(51) Int. Cl.
*B60W 10/02* (2006.01)
*B60W 10/08* (2006.01)
(Continued)

(52) U.S. Cl.
CPC ............. *B60W 20/40* (2013.01); *B60K 6/387* (2013.01); *B60K 6/547* (2013.01); *B60W 10/026* (2013.01);
(Continued)

(58) Field of Classification Search
CPC ...... B60W 20/40; B60W 10/06; B60W 10/08; B60W 10/026; B60W 2710/024;
(Continued)

(56) References Cited

U.S. PATENT DOCUMENTS 7,286,922 B1 * 10/2007 Fischer ............... F16H 61/143
192/54.1
7,770,676 B2    8/2010 Tenbrock et al.
(Continued)

FOREIGN PATENT DOCUMENTS

DE    102006018057 A1    11/2007
DE    102009054468 A1    6/2011
DE    112010000430 T5    8/2012

OTHER PUBLICATIONS

German Search Report DE102015208402.7, dated May 4, 2016. (8 pages).

*Primary Examiner* — Ramya P Burgess
*Assistant Examiner* — Lillian T Nguyen
(74) *Attorney, Agent, or Firm* — Dority & Manning, P.A.

(57) ABSTRACT

A method for operating a drive train of a motor vehicle is provided, the drive train featuring a first drive assembly formed as an internal combustion engine a second drive assembly formed as an electric motor, a start-up element and a transmission). The start-up element features a converter and a lock-up clutch and is connected between the electric motor and the transmission. The electric motor is connected between the internal combustion engine and the start-up element. If a decoupling of the lock-up clutch is requested, the lock-up clutch of the start-up element is initially brought into slip. If the slip at the lock-up clutch of the start-up element reaches a threshold or is greater than the threshold, a target rotational speed is subsequently predetermined for the electric motor and the rotational speed of the electric motor is adjusted to such target rotational speed.

11 Claims, 2 Drawing Sheets

(51) Int. Cl.
*B60W 20/40* (2016.01)
*B60K 6/387* (2007.10)
*B60K 6/547* (2007.10)
*B60W 10/06* (2006.01)
*B60K 6/48* (2007.10)

(52) U.S. Cl.
CPC ............ *B60W 10/06* (2013.01); *B60W 10/08* (2013.01); *B60K 2006/4825* (2013.01); *B60W 2710/024* (2013.01); *B60W 2710/025* (2013.01); *B60W 2710/081* (2013.01); *Y02T 10/6252* (2013.01); *Y02T 10/6286* (2013.01)

(58) Field of Classification Search
CPC ...... B60W 2710/025; B60W 2710/081; B60K 6/547; B60K 6/387; B60K 2006/4825; Y02T 10/6252; Y02T 10/6286
See application file for complete search history.

(56) References Cited

U.S. PATENT DOCUMENTS

| | | | |
|---|---|---|---|
| 8,326,475 B2 | 12/2012 | Yoshida et al. | |
| 8,858,390 B2 | 10/2014 | Schiele et al. | |
| 2009/0312143 A1* | 12/2009 | Allgaier | B60K 6/365 477/5 |
| 2012/0129650 A1* | 5/2012 | Lemp | B60W 10/02 477/5 |

* cited by examiner

TRANSMISSION CONTROL METHOD

FIELD OF THE INVENTION

The present invention relates to a control device and method for operating a drive train.

BACKGROUND

A method for operating a parallel hybrid drive train of a motor vehicle is known from DE 10 2006 018 057 A1. Such a parallel hybrid drive train includes a first drive assembly formed as an internal combustion engine, a second drive assembly formed as an electric motor, a start-up element and a transmission, whereas the start-up element is connected between the electric motor and the transmission and the electric motor is connected between the internal combustion engine and the start-up element. The start-up element according to DE 10 2006 018 057 A1 includes a hydrodynamic start-up element with a converter and a lock-up clutch. In order to uncouple the internal combustion engine that is switched off, a separating clutch is connected between the internal combustion engine and the electric motor. If start-up is to occur upon an all-electric driving of the internal combustion engine, under the state of the art, it is proposed to start up the internal combustion engine by the electric motor, by at least partially closing the clutch connected between the internal combustion engine and the electric motor, whereas the lock-up clutch of the start-up element is further brought into slip, in order to guide a torque generated by the electric motor partially through the converter and partially through the lock-up clutch of the start-up element. Through the slip of the lock-up clutch of the start-up element, it is ensured that the start-up of the internal combustion engine by the electric motor has an impact on the output of the drive train in a manner that does not reduce comfort, in the form of abrupt shocks. For this purpose, according to DE 10 2006 018 057 A1, the lock-up clutch of the start-up element is held in a slip mode during the overall starting process of the internal combustion engine by rotational speed control of the electric motor. Thereby, for the start-up element, namely lock-up clutch of the same, a differential rotational speed is predetermined.

Although the method known from the state of the art provides a comfortable start-up of an internal combustion engine by an electric motor, in the case of a request for a decoupling of the lock-up clutch on the control side, there is a need to enable this decoupling within a shorter time and with greater comfort.

SUMMARY OF THE INVENTION

Exemplary aspects of the present invention are subject to the task of providing a method for operating a drive train and a control device for carrying out the method within a shorter time and with greater comfort. Additional objects and advantages of the invention will be set forth in part in the following description, or may be obvious from the description, or may be learned through the practice of the invention.

This task is solved by a method for operating a drive train described and claimed herein.

In accordance with exemplary aspects of the invention, the lock-up clutch of the start-up element is initially brought into slip If the slip at the lock-up clutch of the start-up element reaches a threshold or is greater than the threshold, a target rotational speed is subsequently predetermined for the electric motor and the rotational speed of the electric motor is adjusted to such target rotational speed. With the method in accordance with exemplary aspects of the invention, it is proposed to initially bring the lock-up clutch into slip in a defined state only to predetermine a target rotational speed for the electric motor and adjust the rotational speed of the electric motor to such target rotational speed. In doing so, a more rapid and, at the same time, more comfortable decoupling of the lock-up clutch of the start-up element is possible.

According to an advantageous additional exemplary form of the invention, if the decoupling of the lock-up clutch is requested, a first target differential rotational speed level for the lock-up clutch of the start-up element is predetermined on the control side, whereas the first target differential rotational speed level is greater than zero in terms of amount. Preferably, if the decoupling of the lock-up clutch is requested, a motor controller on the control side predetermines the first target differential rotational speed level for the lock-up clutch, whereas a start-up element controller predetermines a target differential rotational speed curve in particular along a ramp on the first target differential rotational speed level. Thereby, particularly advantageously, the lock-up clutch can be brought into slip before a rotational speed control subsequently takes place at the electric motor.

According to an advantageous additional exemplary form of the invention, if the decoupling of the lock-up clutch is not further requested, a second target differential rotational speed level for the lock-up clutch is predetermined on the control side, whereas the second target differential rotational speed level is smaller in terms of amount than the first target differential rotational speed level and is greater than or equal to zero in terms of amount. Preferably, the start-up element controller guides the target differential rotational speed along a ramp from the first target differential rotational speed level to the second target differential rotational speed level. In doing so, the decoupling of the lock-up clutch can be terminated particularly advantageously and comfortably.

If the slip at the lock-up clutch reaches or exceeds the threshold, a curve of the target rotational speed is subsequently predetermined for the electric motor. Starting from the current rotational speed of the electric motor upon reaching or exceeding the slip threshold, the target rotational speed is increased, preferably in a ramp-like manner, to a rotational speed dependent on the first target differential rotational speed level of the lock-up clutch, which remains constant as long as the decoupling of the lock-up clutch is requested If the decoupling of the lock-up clutch is not further requested, starting from this rotational speed, the target rotational speed for the electric motor is reduced, preferably in a ramp-like manner, to a rotational speed dependent on the second target differential rotational speed level of the lock-up clutch. Such rotational speed control of the electric motor is particularly advantageous.

According to an advantageous additional exemplary form, if a driver's requested torque changes during a requested decoupling of the lock-up clutch, a start-up element controller newly controls a torque transferred by the lock-up clutch to the driver's requested torque. Thereby, a changing driver's requested torque may be taken into account comfortably. By the fact that the torque transferred by the lock-up clutch is newly controlled to the driver's requested torque and not readjusted, this prevents disorders that, for example, are registered upon the start-up or turning off of the internal combustion engine or upon a cylinder shut-off at the internal combustion engine in the drive train, from affecting the slip at the lock-up clutch.

According to an advantageous additional exemplary form of the invention, during a requested decoupling of the lock-up clutch, a target transmission input torque is calculated depending on a driver's requested torque, whereas a torque transferred by the lock-up clutch, with a slipping lock-up clutch, is adjusted in such a manner that an increase in the torque transferred by the converter caused by the slip of the lock-up clutch is compensated. Thereby, an impermissible change to the transmission input torque caused by the slipping operation of the lock-up clutch can be prevented.

Preferential additional forms arise from the sub-claims and the following description. Embodiments of the invention are, without any limitation, more specifically described by the drawings. Thereby, the following is shown:

BRIEF DESCRIPTION OF THE DRAWINGS

In the following, the invention is more specifically illustrated as an example on the basis of the attached figures. The following are represented in these.

DETAILED DESCRIPTION

Figure 1:
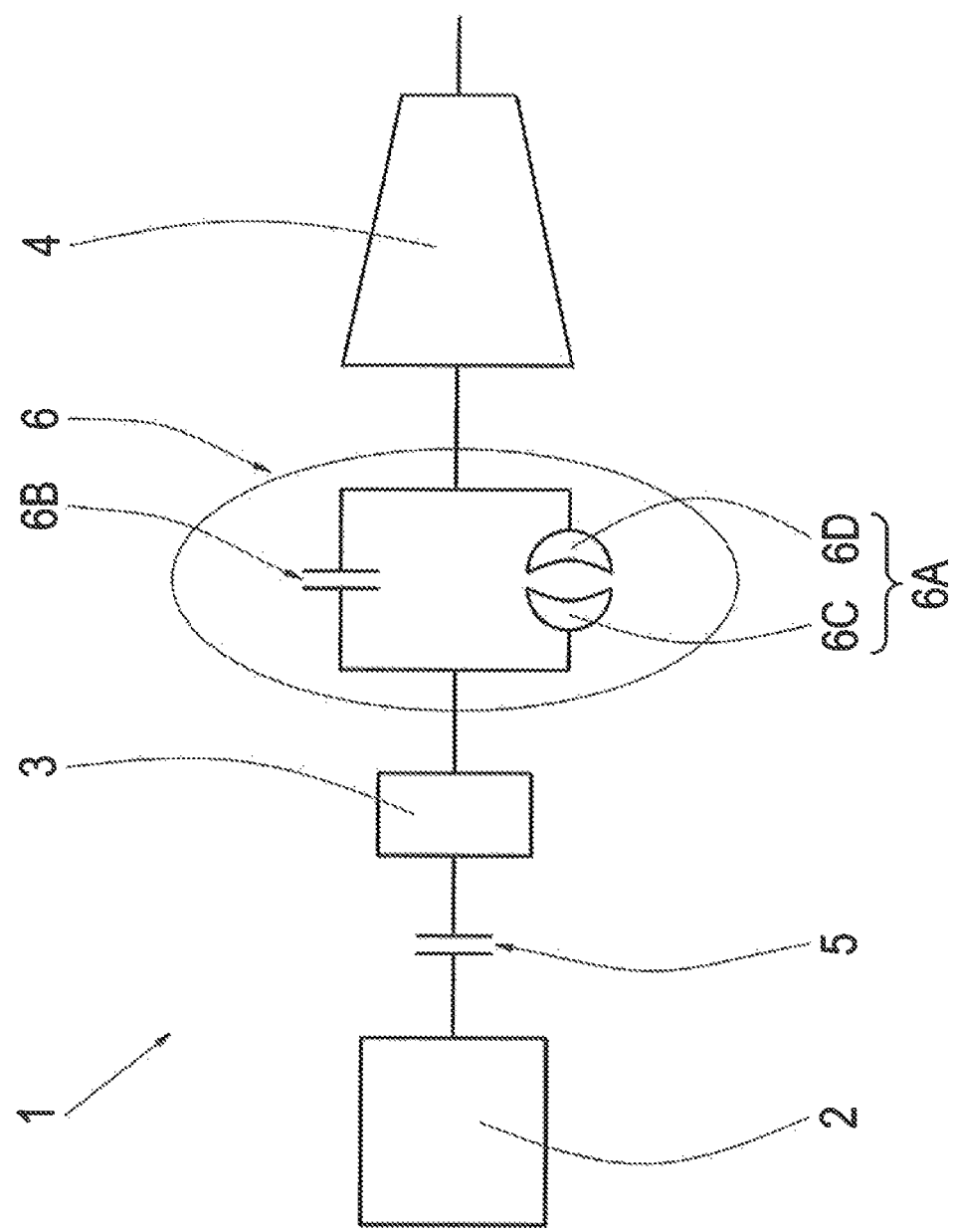
FIG. 1 is a diagram of a drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drive train 1 of a motor vehicle formed as a parallel hybrid drive train. The drive train 1 has a first drive assembly formed as an internal combustion engine 2 and a second drive assembly formed as an electric motor 3, whereas a separating clutch 5 is connected between the internal combustion engine 2 and the electric motor 3. Furthermore, the drive train 1 of FIG. 1 comprises a transmission 4 and a start-up element 6, whereas the start-up element 6 is connected between the electric motor 3 and the transmission 4. The start-up element 6 comprises a hydrodynamic start-up element with a converter 6A and a lock-up clutch 6B connected parallel to the converter 6A, whereas, from the converter 6A, a pump wheel 6C and a turbine wheel 6D are shown.

If all-electric driving takes place with the drive train of FIG. 1, the internal combustion engine 2 is typically stopped and the separating clutch 5 connected between the internal combustion engine 2 and the electric motor 3 is completely open. On the other hand, during hybrid mode, in which both the internal combustion engine 2 and the electric motor 3 are running and provide drive torque, the separating clutch 5 connected between the internal combustion engine 2 and the electric motor 3 is closed.

The operation of the internal combustion engine 2 is controlled or adjusted by a motor controller, and the operation of the transmission 4 is controlled or adjusted by a transmission controller. For controlling and/or adjusting the operation of the electric motor 3, a hybrid controller is typically present. The start-up element 6 is controlled or adjusted by a start-up element controller.

Typically, the start-up element controller and the transmission controller are implemented in a common control device; i.e., in a transmission control device. Moreover, the hybrid controller may be a component of the transmission control device. The motor controller is typically a component of a separate control device; i.e., a motor control device. The motor control device and the transmission control device exchange data between each other.

In the operation of such a parallel hybrid drive train, operating situations arise in which, on the control side, a decoupling of the lock-up clutch 6B is requested. For example, if the internal combustion engine 2 is to be started up by the electric motor 3 from all-electric driving, the start-up of the internal combustion engine 2 through this decoupling of the lock-up clutch 6B is designed to be as comfortable as possible.

If a decoupling of the lock-up clutch 6B is requested, in accordance with exemplary aspects of the invention, the lock-up clutch 6B of the start-up element 6 is initially brought into slip.

Only if the slip of the lock-up clutch 6B of the start-up element 6 reaches or is greater than a defined threshold will a target rotational speed be subsequently predetermined for the electric motor 3 and will the electric motor 3 be adjusted by a rotational speed control to such target rotational speed. Thus, a requested decoupling of the lock-up clutch 6B on the control side can be provided rapidly and comfortably.

Figure 2:
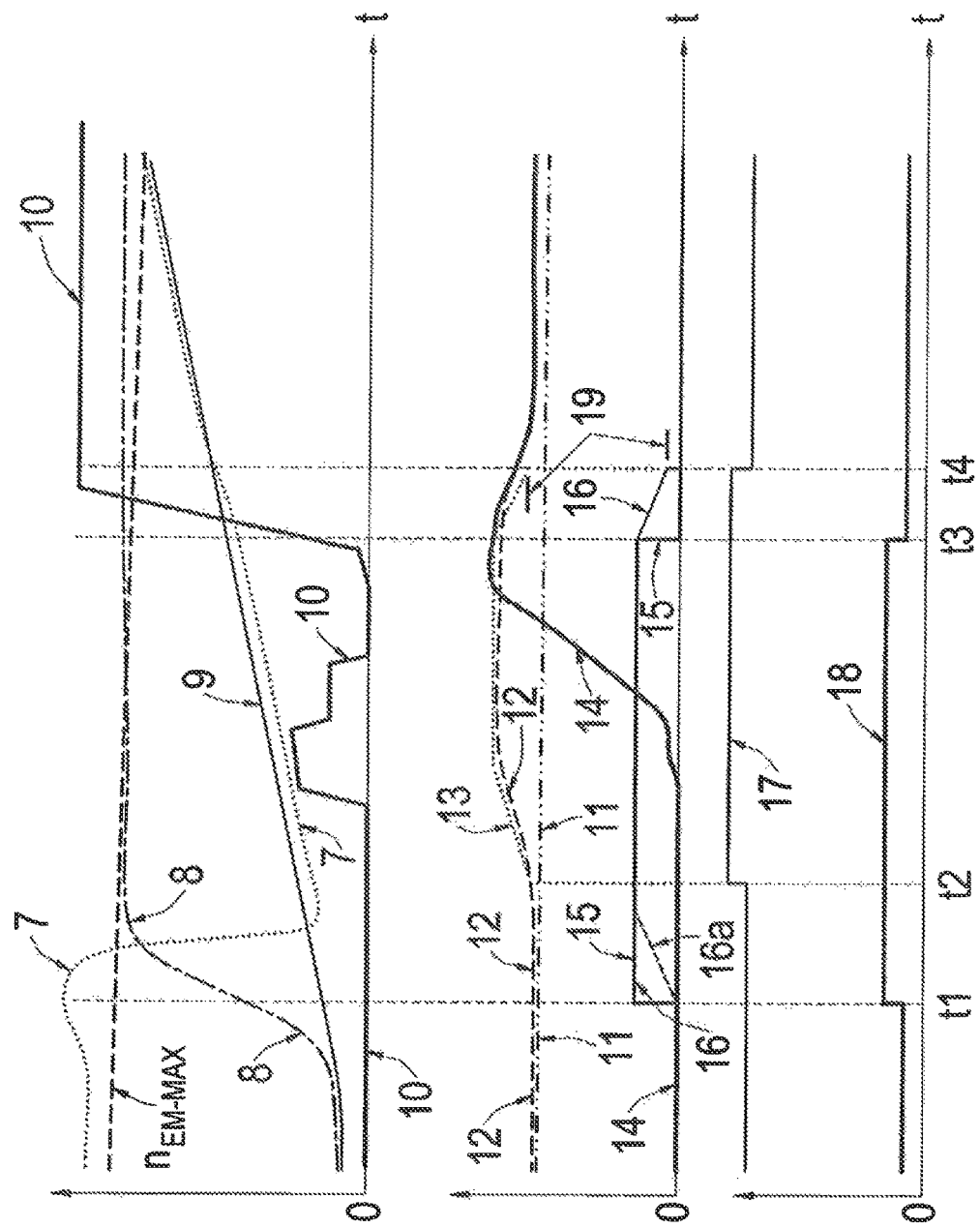
FIG. 2 is a timing diagram to clarify the method in accordance with an exemplary embodiment of the invention.

Further details of the method in accordance with exemplary aspects of the invention are described below with reference to FIG. 2, whereas FIG. 2 shows several curve progressions 7 through 18 over time t; i.e., torque progressions with the curve progressions 7 through 10, rotational speed progressions with the curve progressions 11 through 16 and status signals with the curve progressions 17 and 18. The curve progressions 7 through 18 shown in FIG. 2 are adjusted in the case in which, for the start-up of the internal combustion engine 2 from all-electric driving, a decoupling of the lock-up clutch is 6B is requested on the control side, in order to design the start-up of the internal combustion engine 2 with the highest possible comfort. Thereby, the curve progression 7 shows a torque transferred by the lock-up clutch 6B of the start-up element 6. The curve progression 8 corresponds to the progression of a driver's requested torque. The curve progression 9 shows the chronological progression of an input torque of the transmission 4. The curve progression 10 shows the progression of a torque transferred by the separating clutch 5. The curve progression 11 illustrates a chronological rotational speed curve for the turbine wheel 6D of the converter 6A. The curve progression 12 shows the chronological progression of the rotational speed of the electric motor 3. The curve progression 14 shows the chronological progression of the rotational speed of the internal combustion engine 2. The curve progressions 13, 15 and 16 comprise rotational speed specifications on the control side; i.e., with the curve progression 13, the target rotational speed curve for the electric motor 3, with the curve progression 15, a specification on the control side of a target differential rotational speed level for the lock-up clutch 6B and, with the curve progression 16, 16a, a target differential rotational speed curve of the lock-up clutch 6B. The curve progression 18 shows a request on the control side for a decoupling of the lock-up clutch 6B; the curve progression 17 shows a status signal relating to the implementation or the taking into effect of this requested decoupling.

As already stated, FIG. 2 illustrates details of the method in accordance with exemplary aspects of the invention for the case for which the internal combustion engine 2 is to be started up from all-electric driving by the electric motor 3.

Prior to the point in time t1, the internal combustion engine 2 is stopped; accordingly, the rotational speed 14 of the internal combustion engine 2 prior to the point in time t1 amounts to zero. With a stopped internal combustion engine 2, prior to the point in time t1, the separating clutch 5 is completely open, such that, in accordance with the curve progression 10, the separating clutch 5 does not transfer any torque. Prior to the point in time t1, the driver's requested torque 8 is provided exclusively by the electric motor 3, whereas, in this case, the lock-up clutch 6B is completely closed, in accordance with the curve progression 7. Prior to the point in time t1, the rotational speed 12 of the electric motor 3 corresponds to the rotational speed 11 of the turbine wheel 6D of the converter 6A. Prior to the point in time t1, the driver's requested torque increases, as can be seen from the curve progression 8. Thereby, the increase in the driver's requested torque in FIG. 2 is such that the same may not be solely provided by the electric motor 3, such that, accordingly, a start-up of the internal combustion engine 2 is requested. A maximum torque MEM-MAX of the electric motor 3 is shown in dashed lines in FIG. 2. For the start-up of the internal combustion engine 2, at the point in time t1, a decoupling of the lock-up clutch 6B is requested in order to start up the internal combustion engine 2, with particular comfort, by the electric motor 3. The curve progression 18 of FIG. 2 illustrates that, at the point in time t1, the decoupling of the lock-up clutch 6B is requested, whereas this request for the decoupling of the lock-up clutch 6B remains requested until the point in time t3, and only as of the point in time t3 is the decoupling not further requested.

In order to rapidly and easily implement the requested decoupling of the lock-up clutch 6B, the lock-up clutch 6B of the start-up element 6 is initially brought into slip between the points in time t1 and t2, whereas only then is a target rotational speed predetermined for the electric motor 3 between the points in time t2 and t3 and is the rotational speed of the electric motor 3 adjusted to the target rotational speed in the sense of a rotational speed control.

If, at the point in time t1 in accordance with the signal progression 18, the decoupling of the lock-up clutch 6B is requested, on the control side, a first target differential rotational speed level for the lock-up clutch 6B of the start-up element 6 is predetermined, which is greater than zero in terms of amount. For this purpose, the first target differential rotational speed level for the lock-up clutch 6B of the start-up element 6 is predetermined by the motor controller on the control side in accordance with the curve progression 15, whereas the start-up element controller in accordance with the curve progression 16 or 16a predetermines a target differential rotational speed curve for the lock-up clutch 6B at this first target differential rotational speed level 15.

In accordance with the curve progression 16, this occurs at the point in time t1 in steps, whereas, accordingly in this case, the start-up element controller converts, in steps, the first target differential rotational speed level predetermined in steps by the motor controller into a target differential rotational speed curve 16.

Alternatively, as can be seen from the curve progression 16a, it is possible that the start-up element controller converts the first target differential rotational speed level, predetermined in steps by the motor controller, into a target differential rotational speed curve in such a manner that the target differential rotational speed for the lock-up clutch 6B of the start-up element 6 is guided in a linear manner along a ramp to the first target differential rotational speed level 15.

The first target differential rotational speed level 15 is specified on the control side by the motor controller. Such first target differential rotational speed level 15 is converted by the start-up element controller into the target differential rotational speed curve 16 or 16a, between the points in time t1 and t2 in accordance with the curve progressions 11, 12. The rotational speed of the electric motor 3 can be released by the turbine speed of the converter 6A, such that a slip is accordingly formed at the start-up element 6, i.e. at the lock-up clutch 6B of the start-up element 6; this corresponds to the difference between the two rotational speed curves 11, 12. For this purpose, the transfer capacity of the lock-up clutch 6B is reduced in such a manner that the slip builds up on the same.

At the point in time t2, it is determined that the slip at the lock-up clutch 6B of the start-up element 6 reaches or is greater than the threshold. If, beginning at the point in time t2, subsequent to the bringing into slip of the lock-up clutch 6B, a target rotational speed 13 is predetermined for the electric motor 3, whereas the rotational speed 12 of the electric motor 3 is adjusted in the sense of a rotational speed control to such target rotational speed 13. As can be seen from the signal progression 17, if, at the point in time t2, the differential rotational speed at the lock-up clutch 6B reaches or exceeds the threshold, the status signal 17 changes, such that, at the point in time t2, the decoupling of the lock-up clutch 6B requested at the point in time t1 is implemented or is effective.

According to FIG. 2, starting at the point in time t2, the target rotational speed 13 for the electric motor 3 is initially increased in steps; i.e., it is initialized to the rotational speed of the electric motor current at the point in time t2. Starting from this, the target rotational speed 13 for the electric motor 3 is increased in a linear or ramp-like manner, and subsequently kept constant until point in time t3. The rotational speed at which the target rotational speed, starting from the rotational speed of the electric motor 3 current at the point in time t2, is increased in a ramp-like manner, is dependent on the first target differential rotational speed level of the lock-up clutch 6B.

In FIG. 2, between the points in time t2 and t3, as can be seen from the curve progression 10, after the bringing into slip of the lock-up clutch 6B and after a defined time span of the rotational speed control of the electric motor 3, the transfer capacity of the clutch 5 connected between the internal combustion engine 2 and the electric motor 3 is increased in order to start up the internal combustion engine 2 by the electric motor 3, whereas, in this case, in accordance with the curve progression 14, which corresponds to the rotational speed curve of the internal combustion engine 2, the internal combustion engine 2 is dragged along.

As already stated, the decoupling of the lock-up clutch 6B is requested in FIG. 2 between the points in time t1 and t3; upon and after the point in time t3, such decoupling is not further requested.

Beginning with the point in time t3, in accordance with the curve progression 15 the motor controller no longer requests the first target rotational speed level.

Rather, beginning with the point in time t3, on the control side, a second target differential rotational speed level 19 for the lock-up clutch 6B of the start-up element 6 is predetermined or requested; i.e., by the start-up element controller. This second target differential rotational speed level 19 is smaller in terms of amount than the first target differential rotational speed level 15, the same may be greater than zero or equal to zero, depending on the operating situation of the drive train or the motor vehicle. The second target differential rotational speed level depends on the current operating situation of the drive train and the desired comfort. In FIG. 2, the second target differential rotational speed level 19 is greater than zero, whereas the start-up element controller guides the target differential rotational speed 16 in a linear manner along a ramp of the first target differential rotational speed level 15 to the second target differential rotational speed level 19; i.e., between the points in time t3 and t4. Between the points in time t3 and t4, in accordance with the curve progression 13, the target rotational speed for the electric motor 3 is reduced in a linear manner, whereas, at the point in time t4, the rotational speed control for the electric motor 13 ends and, in accordance with the signal progression 17, the decoupling of the lock-up clutch 6B is terminated at the point in time t4, and is not further effective. If the decoupling of the lock-up clutch 6B is not further requested, beginning at the point in time t3, the target rotational speed for the electric motor 3 is reduced, preferably in a ramp-like manner, to a rotational speed dependent on the second target differential rotational speed level of the lock-up clutch 6B.

Accordingly, it is within the meaning of the present invention that if, for example, for a start-up of the internal combustion engine 2 by the electric motor 3 with a parallel hybrid drive train, a decoupling of the lock-up clutch 6B is requested, the lock-up clutch 6B of the hydrodynamic start-up element 6 is initially brought into slip in a defined manner, and only subsequent thereto is the electric motor 3 adjusted to a target rotational speed in the sense of a rotational speed control.

Preferably, if the decoupling of the lock-up clutch 6B on the control side is no longer requested, the rotational speed control at the target rotational speed is still maintained for a defined time span, in FIG. 2 between the points in time t3 and t4, in order to guide the slip at the lock-up clutch 6B in a defined and adjusted manner to the second target differential rotational speed level.

If, during a requested decoupling, the driver's requested torque 8 changes, the start-up element controller newly controls a torque transferred by the lock-up clutch 6B to the drivers requested torque, thus in the sense of a control and not in the sense of an adjustment. By the fact that the torque transferred by the lock-up clutch 6B is newly controlled to the drivers requested torque and not readjusted, this prevents disorders, for example, that are registered upon the start-up or turning off of the internal combustion engine 2 or upon a cylinder shut-off at the internal combustion engine 2 in the drive train, from affecting the slip at the lock-up clutch 6B.

Preferably, during a requested decoupling of the lock-up clutch 6B, a target transmission input torque is calculated depending on a drivers requested torque. A torque transferred by the lock-up clutch 6B, with a slipping lock-up clutch 6B, is adjusted in such a manner that an increase in the torque transferred by the converter 6A caused by the slip of the lock-up clutch 6B is compensated, such that the actual transmission input torque is not greater than the target transmission input torque.

The invention further relates to a control device for carrying out the method in accordance with exemplary aspects of the invention. The control device includes tools on the hardware side and tools on the software side that serve to carry out the process. The tools on the hardware side include data interfaces for exchanging data with the modules participating in the carrying out of method, in particular with the start-up element 6 and with the electric motor 3.

Furthermore, the tools on the hardware side include a processor for processing data and a memory for data storage. The tools on the software side include program modules for carrying out the method.

The control device according to exemplary aspects of the invention comprises in particular a transmission control device in which the start-up element controller, the transmission controller and the hybrid controller are implemented. Such a transmission control device exchanges data with a motor control device, whereas the motor control device transfers in particular the status signal 18 through the request on the control side for the decoupling of the lock-up clutch 6B to the transmission control device, in order to initiate the carrying out of the method in accordance with exemplary aspects of the invention.

Modifications and variations can be made to the embodiments illustrated or described herein without departing from the scope and spirit of the invention as set forth in the appended claims.

REFERENCE SIGNS

1 Drive train
2 Internal combustion engine
3 Electric motor
4 Transmission
5 Clutch
6 Start-up element
6A Converter
6B Lock-up clutch
6C Pump wheel
6D Turbine wheel
7 Curve progression
8 Curve progression
9 Curve progression
10 Curve progression
11 Curve progression
12 Curve progression
13 Curve progression
14 Curve progression
15 Curve progression
16 Curve progression
17 Curve progression
18 Curve progression

The invention claimed is:

1. A method for operating a drive train of a motor vehicle, the drive train including an internal combustion engine, an electric motor, a start-up element and a transmission, the start-up element including a converter and a lock-up clutch, the start-up element connected between the electric motor and the transmission, the electric motor connected between the internal combustion engine and the start-up element, the method comprising:
bringing the lock-up clutch into slip when a decoupling of the lock-up clutch is requested;
determining a target rotational speed for the electric motor; and
adjusting a rotational speed of the electric motor to the target rotational speed in response to the slip at the lock-up clutch reaching a threshold or being greater than the threshold.

2. The method of claim 1, wherein a first target differential rotational speed level for the lock-up clutch of the start-up element is determined on a control side when the decoupling of the lock-up clutch is requested, a magnitude of the first target differential rotational speed level being greater than zero.

3. The method of claim 2, wherein a motor controller on the control side determines the first target differential rotational speed level for the lock-up clutch of the start-up element when the decoupling of the lock-up clutch is requested, the method further comprising determining a target differential rotational speed curve at the first target differential rotational speed level with a start-up element controller.

4. The method of claim 3, wherein the start-up element controller determines a ramp-like curve of the target differential rotational speed at the first target differential rotational speed level.

5. The method of claim 2, further comprising determining a second target differential rotational speed level for the lock-up clutch of the start-up element on the control side when the decoupling of the lock-up clutch is no longer requested, the second target differential rotational speed level being less than the first target differential rotational speed level, a magnitude of the second target differential rotational speed level being greater than or equal to zero.

6. The method of claim 5, wherein the start-up element controller determines a ramp-like curve of the target differential rotational speed from the first target differential rotational speed level to the second target differential rotational speed level.

7. The method of claim 5, wherein,
when the slip at the lock-up clutch reaches the threshold or is greater than the threshold, a curve of the target rotational speed is determined for the electric motor such that the target rotational speed is increased in a ramp-like manner from a current rotational speed of the electric motor to a rotational speed dependent on the first target differential rotational speed level of the lock-up clutch, which remains constant as long as the decoupling of the lock-up clutch is requested, and
when the decoupling of the lock-up clutch is no longer requested, the target rotational speed for the electric motor is reduced in a ramp-like manner from the current rotational speed to a rotational speed dependent on the second target differential rotational speed level of the lock-up clutch.

8. The method of claim 1, wherein a torque transferred by the lock-up clutch is controlled to a driver requested torque when the driver requested torque changes during the requested decoupling of the lock-up clutch.

9. The method of claim 8, wherein a target transmission input torque is calculated depending on the driver requested torque during the requested decoupling of the lock-up clutch, the torque transferred by the lock-up clutch adjusted such that an increase in a torque transferred by the converter caused by the slip of the lock-up clutch is compensated.

10. A control device for operating a drive train, the control device programmed to implement the method of claim 1.

11. The method of claim 1, wherein the decoupling of the lock-up clutch is requested during a startup of the internal combustion engine, and the electric motor is not rotationally speed controlled until the slip at the lock-up clutch reaches the threshold or is greater than the threshold during the startup of the internal combustion engine.

* * * * *